(12) United States Patent
Kim et al.

(10) Patent No.: US 9,790,408 B2
(45) Date of Patent: Oct. 17, 2017

(54) POLARIZING PLATE HAVING PRESSURE SENSITIVE ADHESIVE LAYER WITH IMPROVED LIGHT LEAKAGE PROPERTY

(75) Inventors: Se Ra Kim, Daejeon (KR); In Cheon Han, Seoul (KR); Seung Joon Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1166 days.

(21) Appl. No.: 12/449,212

(22) PCT Filed: Jan. 17, 2008

(86) PCT No.: PCT/KR2008/000292
§ 371 (c)(1),
(2), (4) Date: Dec. 7, 2009

(87) PCT Pub. No.: WO2008/093946
PCT Pub. Date: Aug. 7, 2008

(65) Prior Publication Data
US 2010/0091223 A1  Apr. 15, 2010

(30) Foreign Application Priority Data
Jan. 31, 2007 (KR) .................. 10-2007-0010005

(51) Int. Cl.
G02F 1/1335 (2006.01)
C09J 133/06 (2006.01)
G02B 5/30 (2006.01)

(52) U.S. Cl.
CPC ...... *C09J 133/06* (2013.01); *G02F 1/133528* (2013.01); *B32B 2457/202* (2013.01); *C09J 2201/606* (2013.01); *C09J 2201/622* (2013.01); *G02B 5/30* (2013.01); *G02F 2202/28* (2013.01); *Y10T 428/1059* (2015.01); *Y10T 428/1077* (2015.01)

(58) Field of Classification Search
CPC .............. G02F 2202/28; G02F 1/1335; G02F 1/133528; G02F 1/133533; G02F 1/133536; G02F 2001/1335; G02F 2001/133528; G02F 2001/133531; G02F 2001/13356; G02F 2001/133562; G02F 2001/133567; G02B 1/08; G02B 5/3016; G02B 6/0056; G02B 5/30; C09J 133/06; C09J 2201/606; C09J 2201/622; B32B 2457/202; Y10T 428/1059; Y10T 428/1077
USPC ........... 156/106, 247; 349/96–103, 122–138; 427/207.1, 208, 208.4, 208.6, 208.8; 428/1.1, 1.3, 1.5, 355 R, 355 EN, 355 BL, 428/355 AC, 356; 524/236, 356, 555, 524/556; 525/329.9, 330.5; 526/931
See application file for complete search history.

(56) References Cited

U.S. PATENT DOCUMENTS

| 2003/0054166 | A1* | 3/2003 | Chang et al. ......... 428/355 AC |
| 2005/0239965 | A1* | 10/2005 | Kim et al. ................. 525/191 |
| 2006/0114387 | A1* | 6/2006 | Song et al. ............... 349/124 |
| 2006/0128925 | A1* | 6/2006 | Arai et al. .................. 528/44 |

FOREIGN PATENT DOCUMENTS

| JP | 09-292518 | 11/1997 | |
| JP | 10-044292 | 2/1998 | |
| JP | 2003050313 A * | 2/2003 | .......... G02B 5/30 |
| JP | 2004323543 A * | 11/2004 | .......... C09J 133/04 |
| JP | 2006-018245 | 1/2006 | |
| KR | 10-2004-0016382 | 2/2004 | |
| KR | 10-2005-0102083 | 10/2005 | |
| KR | 10-2006-0048299 | 5/2006 | |
| KR | 10-2006-0072086 | 6/2006 | |
| WO | WO 2006059780 A1 * | 6/2006 | .......... G02B 5/30 |

OTHER PUBLICATIONS

JP 2003050313 A, Feb. 2003, English Translation provided by http://dossier1.ipdl.inpit.go.jp/AIPN/odse_top_dn.ipdl?N0000=7400.*
JP 2004323543 A, Nov. 2004, English Translation provided by http://dossier1.ipdl.inpit.go.jp/AIPN/odse_top_dn.ipdl?N0000=7400.*

* cited by examiner

*Primary Examiner* — Eli D Strah
(74) *Attorney, Agent, or Firm* — Dentons US LLP

(57) ABSTRACT

The present invention relates to a polarizing plate characterized in that pressures-sensitive adhesives used in the upper and lower polarizing plates have different elastic properties and a liquid crystal display device comprising the same. More specifically, the present invention relates to a polarizing plate with improved light leakage phenomenon in accordance with bend of liquid crystal panels, characterized in that as slid distances of pressure-sensitive adhesives on the polarizing plate having the pressure-sensitive adhesive layer formed thereon and bonded to a glass plate with a contact area of 1 cm×1 cm at the time of applying a load of 1,000 gf at room temperature (25° C.) for 1,000 seconds, the difference between the slid distance $X_1$ of pressure-sensitive adhesive for the upper polarizing plate and the slid distance $X_2$ of pressure-sensitive adhesive for the lower polarizing plate is 50 to 500 μm.

10 Claims, No Drawings

POLARIZING PLATE HAVING PRESSURE SENSITIVE ADHESIVE LAYER WITH IMPROVED LIGHT LEAKAGE PROPERTY

This application claims the benefit of PCT/KR2008/000292 filed on Jan. 17, 2008, and Korean Patent Application No. 10-2007-0010005 filed on Jan. 31, 2007, both of which are hereby incorporated herein by reference for all purposes in their entirety

TECHNICAL FIELD

The present invention relates to a polarizing plate having a pressure-sensitive adhesive layer. More specifically, the present invention relates to a polarizing plate on which a pressure-sensitive adhesive layer comprising a pressure-sensitive adhesive composition is formed, wherein the composition may improve a light leakage phenomenon caused by a bend of liquid crystal panels, and a liquid crystal display device comprising the same.

BACKGROUND ART

Generally, in preparing liquid crystal display devices, liquid crystal cells comprising liquid crystals and polarizing plates are basically required, and adhesive layers or pressure-sensitive adhesive layers suitable for bonding them have to be used. In addition, for improving functions of liquid crystal display devices, a phase retardation plate, a compensation plate for wide view angle, a brightness enhancement film, and the like may be used, with additionally adhered to the polarizing plate.

Major structure forming a liquid crystal display device comprises, generally, a uniformly aligned liquid crystal layer; a polarizing plate with a multi-layer structure, incorporated into a pressure-sensitive adhesive layer or an adhesive layer, based on a liquid crystal cell consisted of a transparent glass plate or plastic sheet material containing a transparent electrode layer; a phase retardation plate; and an additional functional film layer and the like.

The structure of polarizing plate is one comprising an iodine compound or a dichroic polarizing material aligned in a certain direction. To protect these polarizing elements, multi-layers are formed on both sides using a protective film such as triacetyl cellulose (TAC). In addition, the polarizing plate may additionally comprise a phase retardation film, a compensation film for wide view angle such as a liquid crystal type film, a brightness enhancement film, a reflective layer, or an antiglare layer, in a shape having a unidirectional molecular alignment.

Each film mentioned above is made of materials having different molecular structures and compositions, and so have different physical properties. Especially, under heat or moisture-heat conditions, the dimensional stability according to shrinkage or expansion of materials having a unidirectional molecular alignment is insufficient.

TN (Twisted Nematic) shaped or STN (Super Twisted Nematic) shaped liquid crystal display manner is generally such that polarizing plates are adhered to both surfaces of a liquid crystal panel, with crossing their optical axes of 45 and 135. In said liquid crystal display manner, when the polarizing plate is fixed by a pressure-sensitive adhesive, a deforming stress by heat or moisture-heat environment remains in a residual state and thereby light leakage is caused at portions on which the stress is focused. To solve such problem, a research has been tried, which is intended to improve light leakage by providing a pressure-sensitive adhesive with function of stress relieving and lessening stress concentration with shrinkage of the polarizing plate.

However, in liquid crystal display devices such as IPS (In-Plane Switching), or VA (Vertical Alignment), mainly utilized in large TVs, polarizing plates are adhered to both surfaces of liquid crystal panels with crossing their light axes of 0 and 90. Such liquid crystal display devices cause light leakage by stress concentration in heat or moisture-heat environment, but it is known the bend of liquid crystal panels rather than the stress concentration as a main cause. Said bend of liquid crystal panels is caused by difference (especially, elongation axis direction) in shrinkage ratios of polarizing plates depending on their positions under heat or moisture-heat conditions. In TN or STN liquid crystal display device, that is, polarizing plates are adhered with crossing their light axes of 45 and 135 so that elongation axis directions of upper and lower polarizing plates are positioned evenly or symmetrically, whereas polarizing plates in liquid crystal display devices such as IPS or VA are adhered with crossing their axes of 0 and 90 so that elongation axis directions of upper and lower polarizing plates are asymmetrical. Accordingly, in the liquid crystal display devices such as IPS or VA, the bend caused by the upper polarizing plate is different from that caused by the lower polarizing plate, and whereby the bend of liquid crystal panel is caused in a direction of high bend over all. The liquid crystal panels are pressured by top cases used in fixing them, due to such bend of liquid crystal panels, and whereby the light leakage according to unevenness of liquid crystals is caused.

JP Unexamined Patent Publication No. 2006-58718 discloses a pressure-sensitive adhesive for polarizing plates having a storage elasticity modulus of $10^5$ to $10^9$ Pa at 0 to 50° C. after cross-linking and a glass transition temperature of −20° C. or more, to inhibit the light leakage of liquid crystal display devices such as IPS or MVA manners. It is described in said disclosure that the light leakage can be improved by using pressure-sensitive adhesives with high elasticity modulus and glass transition temperature over conventional pressure-sensitive adhesives. However, it is difficult to improve the light leakage by bend of liquid crystal panels with the method described above, as well as it is not mentioned to improve bend of liquid crystal panels such as IPS or MVA manners.

DISCLOSURE

Technical Problem

Therefore, there is really a need for development of novel pressure-sensitive adhesives for polarizing plates which can improve the light leakage by bend of liquid crystal panels that may be caused on using them for a long time as well as under heat or moisture-heat conditions, with almost none of changing major properties of polarizing plate articles, such as endurance reliability, and polarizing plates applied by the adhesives.

Technical Solution

To solve conventional problems above, one object of the present invention is to provide a polarizing plate, which improves light leakage by bend of liquid crystal panels as well as has excellent endurance reliability under high temperature/high humidity conditions.

The other object of the present invention is to provide a liquid crystal display device comprising polarizing plates with the above properties.

The above objects may be achieved by the present invention described below.

BEST MODE

The present invention relates to a polarizing plate comprising a pressure-sensitive adhesive layer containing a pressure-sensitive adhesive composition to comply with Equation 1 below:

$$^\Delta X = X_1 - X_2 = 50\ \mu m \sim 500\ \mu m \quad (1)$$

wherein, Xs are slid distances of pressure-sensitive adhesives on the polarizing plate having the pressure-sensitive adhesive layer formed thereon and bonded to a glass plate with a contact area of 1 cm×1 cm at the time of applying a load of 1,000 gf at room temperature (25° C.) for 1,000 seconds, $X_1$ is a slid distance of the pressure-sensitive adhesive for the upper polarizing plate, $X_2$ is a slid distance of the pressure-sensitive adhesive for the lower polarizing plate, and $^\Delta X = X_1 - X_2$ is a difference between the slid distance of pressure-sensitive adhesive for the upper polarizing plate and the slid distance of pressure-sensitive adhesive for the lower polarizing plate.

The present invention also relates to a liquid crystal display device comprising a liquid crystal panel having the said polarizing plate bonded to one surface or both surfaces of a liquid crystal cell.

The present invention is described in detail below.

The present inventors found that when, as pressure-sensitive adhesive for the upper polarizing plates and pressure-sensitive adhesive for the lower polarizing plates, those with different physical properties were used, the light leakage by bend could be improved. The degree of bend is different depending on differences of elongation axis directions and structures between the upper polarizing plate and the lower polarizing plate.

That is, since the bend by the upper polarizing plate is larger than the bend by the lower polarizing plate, it could be known that total bend was bent toward the upper polarizing plate after adhering the upper and lower polarizing plates. Therefore, it is disclosed that the light leakage phenomenon depending on bend may be improved by using pressure-sensitive adhesives with different elastic properties in the upper and lower polarizing plates, respectively, and total balance of upper and lower bends is equalized, by making the bend by the lower polarizing plate and the bend by the upper polarizing plate similar, to establish the present invention.

The present invention is characterized in that the pressure-sensitive adhesives used in the upper and lower polarizing plates have a difference ($^\Delta X = X_1 - X_2$) in slid distances as defined above of 50 μm~500 μm. That is, the degree of elasticity in pressure-sensitive adhesive may be measured through a slid distance ($X_1$ or $X_2$) under a load of 1,000 gf. The object of the present invention may be accomplished by using pressure-sensitive adhesives having a slid distance difference in a certain level as the upper and lower pressure-sensitive adhesive for polarizing plates, respectively.

In the polarizing plates according to the present invention, the difference between a slid distance of the pressure-sensitive adhesive for the upper polarizing plate and a slid distance of the pressure-sensitive adhesive for the lower polarizing plate is 50 μm to 500 μm, and more preferably, 100 μm to 300 μm. If the difference of slid distances is less than 50 μm, the liquid crystal panel gets bent toward the upper polarizing plate by unbalance of bend between the upper and lower polarizing plates. If the difference is more than 500 μm, the liquid crystal panel gets bent toward the lower polarizing plate, and so the light leakage is caused.

In addition, the pressure-sensitive adhesive composition used in the present polarizing plate is preferably one to further comply with Equation 2 below.

$$X_1\ or\ X_2 = 100\ \mu m \sim 1{,}100\ \mu m \quad (2)$$

wherein, $X_1$ and $X_2$ are as defined above.

The light leakage depending on bend may be improved by the difference of slid distances as defined in Equation 1 above. But, when each slid distance of the pressure-sensitive adhesives for the upper and lower polarizing plates complies with more than 100 μm and less than 1,100 μm, an excellent endurance reliability may be provided under high temperature or high humidity conditions. More preferably, $X_1$ or $X_2 = 200\ \mu m \sim 900\ \mu m$. If the slid distance of pressure-sensitive adhesive is 100 μm or less, there is a problem that endurance reliability such as looseness is deteriorated. If the slid distance of pressure-sensitive adhesive is 1,100 μm or more, cohesion strength of pressure-sensitive adhesive is lowered, and a problem in adhesion durability may be caused.

The present pressure-sensitive adhesive may use all adhesion and/or bonding materials to optically be used such as acryl-based, silicone-based, rubber-based, urethane-based, polyester-based, or epoxy-based pressure-sensitive adhesives without limitation, as long as it complies with Equation 1, preferably Equations 1 and 2. Acrylic pressure-sensitive adhesives are most preferred.

The different properties of the pressure-sensitive adhesive for the upper polarizing plate and the pressure-sensitive adhesive for the lower polarizing plate used herein may be regulated by controlling kinds or cross-linking density of acrylic copolymers.

Preferably, said acrylic pressure-sensitive adhesive composition used herein comprises i) 90 to 99.9 parts by weight of (meth)acrylic acid ester monomer having an alkyl group of 1 to 12 carbon atoms; and ii) 0.1 to 10 parts by weight of vinyl monomer and/or acrylic monomer having a cross-linkable functional group.

Said (meth) acrylic acid ester monomer having an alkyl group of 1 to 12 carbon atoms may use alkyl ester that acrylic acid (or methacrylic acid) has 1 to 12 carbon atoms. Especially, when the alkyl group is in a long-chain shape, cohesion strength of pressure-sensitive adhesives is lowered. Therefore, to maintain cohesion strength at high temperature, it is preferred to use alkyl ester of 2 to 8 carbon atoms of acylic acid (or methacrylic acid). Specially, for said (meth)acrylic acid ester monomer having an alkyl group of 1 to 12 carbon atoms, methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylbutyl(meth)acrylate, 2-ethylhexyl(meth)acrylate, n-octyl(meth)acrylate, isooctyl(meth)acrylate, or isononyl(meth)acrylate may be used alone or in mixture thereof.

Said (meth)acrylic acid ester monomer having an alkyl group of 1 to 12 carbon atoms is preferably included in an amount of 90 to 99.9 parts by weight. If the amount is less than 90 parts by weight, the initial adhesion strength is lowered. If the amount is in excess of 99.9 parts by weight, there may be caused a problem in durability due to low cohesion strength. Said vinyl monomer and/or acrylic monomer having a cross-linkable functional group functions to react with a cross-linking agent and give cohesion strength or adhesion strength by a chemical bond to the pressure-sensitive adhesive such that cohesion failure of the pressure-sensitive adhesive is not caused in high temperature or high humidity conditions. For said vinyl monomer and/or acrylic monomer having a cross-linkable functional group, a hydroxy group containing monomer for example 2-hydroxyethyl(meth)acrylate, 2-hydroxypropyl(meth)acrylate, 4-hydroxybutyl(meth)acrylate, 6-hydroxyhexyl(meth)acrylate, 2-hydroxyethyleneglycol(meth)acrylate, or 2-hydroxypropyleneglycol(meth)acrylate; a carboxyl group containing monomer, for example (meth)acrylic acid, acylic acid dimer, itaconic acid, maleic acid, maleic anhydride or fumaric acid; or a nitrogen containing monomer, such as acrylamide, N-vinylpyrrolidone, or N-vinyl carprolactam may be used alone or in mixture thereof.

Said vinyl monomer and/or acrylic monomer having a cross-linkable functional group is preferably included in the acrylic copolymer in an amount of 0.1 to 10 parts by weight. If the amount is less than 0.1 parts by weight, there are problems that cohesion failure is easily developed in high temperature or high humidity conditions and enhancing effect of bonding strength is lowered. If the amount is in excess of 10 parts by weight, there are problems that compatibility is reduced to develop severe surface migration, flowing characteristic is reduced, and stress releasing property is lowered due to elevated cohesion strength.

In addition, the present invention preferably comprises a co-monomer as an optional component, for regulating the glass transition temperature of pressure-sensitive adhesive on preparing the acrylic copolymer or providing other functionality.

If said co-monomer is an acryl pressure-sensitive adhesive resin having a glass transition temperature of −130 to 50 ? in a state of uncross-linking as a monomer having a usual copolymerizable vinyl group, all the co-monomer may be used, but preferably vinyl monomer of Formula 1 below.

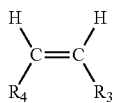

wherein,
R$_4$ represents hydrogen or alkyl,
R$_3$ represents cyano, phenyl unsubstituted or substituted with alkyl, acetyloxy, or COR$_5$, where R$_5$ represents amino or glycidyloxy unsubstituted or substituted with alkyl.

Preferred examples of said functional monomer include, but not limited to, acrylonitrile, (meth)acrylamide, N-methylacrylamide, styrene, methylstyrene, glycidyl(meth)acrylate, and vinylacetate. Said monomer may be used alone or in mixture thereof.

The acrylic copolymer comprising the above ingredients may be prepared by usual methods such as solution polymerization, photo-polymerization, bulk polymerization, suspension polymerization, or emulsion polymerization, and more preferably solution polymerization. Here, it is preferable to set the polymerization temperature between 50 to 140 ? and to mix an initiator after monomers are homogeneously mixed.

In addition, the pressure-sensitive adhesive is preferably used after removing ingredients inducing bubbles such as volatiles or reaction residues therein. If cross-linking density or molecular weight of the pressure-sensitive adhesive is so low that its elasticity is too low, small bubbles present between the glass plate and the pressure-sensitive adhesive layer become large to form scatterers in the pressure-sensitive adhesive layer. If the pressure-sensitive adhesive with too high elasticity is used for a long time, the releasing phenomenon is developed at the end portion of pressure-sensitive adhesive due to excessive cross-linking reaction.

The present acrylic pressure-sensitive adhesive composition may further comprise a cross-linking agent.

Said cross-linking agent may regulate adhesion of the pressure-sensitive adhesive depending on the used amount thereof, and functions to improve cohesion of the pressure-sensitive adhesive by reacting with a carboxyl group or a hydroxy group.

For said cross-linking agent, isocyanate compounds, epoxy compounds, aziridine compounds, or metal chelate compounds may be used. Especially, it is preferred to use isocyanate compounds as the cross-linking agent.

Specifically, as said isocyanate compounds, tolylenediisocyante, xylenediisocyanate, diphenylmethanediisocyanate, hexamethylenediisocyanate, isoformdiisocyanate, tetramethylxylene diisocyanate, naphthalenediisocyanate, or reaction products thereof with polyol, for example trimethylolpropane may be used.

For said epoxy compounds, ethyleneglycoldiglycidylether, triglycidylether, trimethylolpropanetriglycidylether, N,N,N',N'-tetraglycidylethylenediamine, or glycerin diglycidylether may be used.

As said aziridine compounds may be used such as N,N'-toluene-2,4-bis(1-aziridinecarboxide), N,N'-diphenylmethane-4,4'-bis(1-aziridinecarboxide), triethylenemelamine, bisisophthaloyl-1-(2-methylaziridine), or tri-1-aziridinylphosphineoxide may be used.

In addition, as said metal chelate compounds obtained by coordinating a multi-valent metal, such as aluminum, iron, zinc, tin, titanium, antimony, magnesium, or vanadium to acetylacetone or acetoacetic acid ethyl can be used.

If the cross-linking reaction of functional groups in said multi-functional cross-linking agent above has not almost to be occurred in a combination procedure practiced for forming a pressure sensitive adhesive layer, uniform coating works can be practiced. After finishing such coating works followed by drying and aging procedures, the pressure-sensitive adhesive layer having elasticity and strong cohesion may be obtained, with forming the cross-linking structure. Then, adhesion properties, such as endurance reliability, and cutting properties, of adhesion products are improved by the strong cohesion of pressure sensitive adhesive.

Said multi-functional cross-linking agent above is preferably included in an amount of 0.01 to 10 parts by weight based on 100 parts by weight of acrylic copolymer. If the amount is within the above ranges, the pressure-sensitive adhesive has an excellent cohesion, develops no problem in adhesion durability such as bubbles or releasing, and develops no looseness and the like to have an excellent effect in endurance reliability.

Meanwhile, the present acrylic pressure-sensitive adhesive composition has preferably a cross-linking density of 5 to 95%. If the cross-linking density is less than 5%, the adhesive may have so low cohesion to cause a problem in adhesion durability such as bubbles or releasing. If the density is in excess of 95%, there is a problem that endurance reliability is deteriorated, such as looseness.

If necessary, the acrylic pressure-sensitive adhesive composition comprising the above ingredients may further use a silane coupling agent or a tackifier resin.

If said silane coupling agent is adhered to a glass substrate, it functions to improve adhesion stability and thus more heat resistance, moisture resistance properties. Especially, when said silane coupling agent is left for a long time under high temperature and humidity conditions, it functions to improve adhesion reliability.

As said silane coupling compound, γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane and the like may be used alone or in mixture thereof.

Said silane coupling agent is preferably included in an amount of 0.005 to 5 parts by weight based on 100 parts by weight of acrylic copolymer. If the amount is within the above ranges, it is more preferred to improve adhesion stability and adhesion reliability under high temperature/high humidity conditions.

Said tackifier resin functions to regulate the adhesion property of acrylic pressure-sensitive adhesive.

For said tackifier resin may use a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like may be used alone or in mixture thereof.

Said tackifier resin is preferably included in an amount of 1 to 100 parts by weight based on 100 parts by weight of acrylic copolymer. If the amount is within the above ranges, it is more preferred to improve compatibility and cohesion of the pressure-sensitive adhesive.

In addition, the present acrylic pressure-sensitive adhesive composition may further use additives such as acrylic low molecular weight materials, epoxy resins, hardeners, ultraviolet stabilizers, antioxidants, colorants, reinforcing agents, fillers, antifoaming agents, surfactants or plasticizers, if desired.

Of course, the present acrylic pressure-sensitive adhesive composition comprising the above ingredients may be prepared by usual methods. Particularly, it may be prepared by heat curing or light curing, and the like.

On the other hand, the polarizing plate according to the present invention comprises a pressure-sensitive adhesive layer formed from said acrylic pressure-sensitive adhesive composition and formed on one surface or both surfaces of the polarizing film. Polarizing films or polarizing devices constituting the polarizing plate are not specifically limited.

Said polarizing film is, for example, a film obtained by containing a polarizing component such as iodine or dichroic dye onto polyvinyl alcohol resin film, and elongating the resulting product. The thickness of said polarizing film is also not specifically limited, but said polarizing film may have an usual thickness. Said polyvinyl alcohol resin may use polyvinyl alcohol, polyvinyl formal, polyvinyl acetal and safonified product of ethylene vinyl acetate copolymer, and the like.

On both surfaces of the polarizing film, a multi-layer film is formed, the multi-layered film comprising a protective film consisting of a cellulose film such as triacetyl cellulose, etc.; a polyester film such as polycarbonate, or polyethylene terephthalate, etc.; a polyether sulphone film; a polyolefin film such as polyethylene, polypropylene, polyolefine having cyclo or norbornene structure or ethylene propylene copolymer. The thickness of these protective films is not specifically limited, but these protective films have an usual thickness. The method of forming the pressure-sensitive adhesive layer on a polarizing film is not specifically limited in the present invention. For example, a method in which the pressure-sensitive adhesive is applied directly on the surface of a polarizing film by using Bar Coater and then dried, or a method comprising the steps of applying the pressure-sensitive adhesive on the surface of releasable substrate, drying the adhesive, transferring the pressure-sensitive adhesive layer formed on the surface of releasable substrate to the surface of polarizing film, and aging the layer may be used for forming the pressure-sensitive adhesive layer on a polarizing film.

In addition, on the polarizing plate of the present invention may be laminated one or more layers providing additional functions, such as protective layer, reflecting layer, anti-glare layer, phase retardation plate, compensation film for wide view angle, and brightness enhancing film. The protective film according to the present invention may also be adhered to each functional layer.

The present invention also relates to a liquid crystal display device comprising said polarizing plate.

The polarizing plate applied by the present pressure-sensitive adhesive can be applied to all usual liquid crystal display devices, the kind of which liquid crystal panel is not specifically limited. Preferably, the present invention may construct liquid crystal display devices comprising a liquid crystal panel having the pressure-sensitive adhesive polarizing plate bonded to one surface or both surfaces of a liquid crystal cell.

As shown above, the polarizing plate, on which the present pressure-sensitive adhesive composition is formed, has an effect of improving light leakage by bend of liquid crystal panel as well as excellent endurance reliability under high temperature/high humidity conditions.

The present invention is explained in more detail through examples and comparative examples below. The examples are provided to help the specific understanding of the present invention, but the scope of the present invention is not restricted to these examples.

Preparation Example 1

Preparation of Acrylic Copolymer A-1
(Preparation of Acrylic Copolymer)

To 1 L reactor equipped with a cooling system for reflux of nitrogen gas and easy regulation of temperature, mixture of monomers consisting of 95.4 parts by weight of n-butylacrylate (BA), 5.1 parts by weight of acrylic acid (AA) and 0.5 parts by weight of hydroxyethylmethacrylate (2-HEMA) was introduced, and 100 parts by weight of ethyl acetate (EAc) as a solvent was then added. To remove oxygen, the reactor was purged by nitrogen gas for 1 hour, and the temperature was kept at 62° C. 0.03 parts by weight of azobisisobutyronitrile (AIBN) diluted in ethylacetate by a concentration of 50% as a reaction initiator was added to the above mixture and reacted for 8 hours to prepare an acrylic copolymer.

(Combination Procedure)

100 Parts by weight of the acrylic copolymer prepared above, and 0.5 parts by weight of tolylenediisocyanate adduct of isocyanate trimethylolpropane (TDI-1) were added, diluted to an appropriate concentration, and mixed homogeneously. Then, a releasing paper was then coated with the resulting mixture and dried to form a homogeneous pressure-sensitive adhesive layer with a thickness of 25 μm.

Preparation Example 2~6

Preparation of Acrylic Copolymer A-2~A6

The same method as Preparation of acrylic copolymer A-1 above was practiced except for using the components and ratios in Preparation of acrylic copolymer A-1 as shown in Table 1 below. Unit in Table 1 is represented in part by weight.

TABLE 1

| Class | | A-1 | A-2 | A-3 | A-4 | A-5 | A-6 |
|---|---|---|---|---|---|---|---|
| Acrylic copolymer | n-BA | 95.4 | 95.4 | 82.0 | 82.0 | 95.4 | 95.4 |
| | EA | | | 16.8 | 16.8 | | |
| | AA | 5.1 | 5.1 | | | 5.1 | 2.4 |
| | 2-HEMA | 0.5 | 0.5 | 1.2 | 1.2 | 0.5 | 0.1 |
| Cross-linking agent | | 0.5 | 0.6 | 0.5 | 0.05 | 1.0 | 0.5 | n-BA: n-butylacrylate
EA: ethylacrylate
AA: acrylic acid
2-HEMA: 2-hydroxyethylmethacrylate Example 1

(Laminating Procedure)

The pressure-sensitive adhesive layer A-1 prepared above was laminated on an upper polarizing plate, the pressure-sensitive adhesive layer A-2 was laminated on a lower polarizing plate, and then subjected to adhesion process.

(Evaluation of Physical Properties)

Using the polarizing plate prepared above, slid distances, endurance reliability and light leakage of the pressure-sensitive adhesive were measured with the methods below. The results were represented in Table 2 below.

Measurement of Slid Distance

After bonding the upper or lower polarizing plates, to which the pressure-sensitive adhesive was adhered, to a glass plate with a contact area of 1 cm×1 cm and then aged at room temperature for 24 hours, the slid distance of a pressure-sensitive adhesive was measured at the condition of a load of 1,000 gf for 1,000 seconds.

Endurance Reliability

The polarizing plate (90 mm×170 mm) coated with the pressure-sensitive adhesive as prepared in Example 1 was attached to both surfaces of a glass substrate (110 mm×190 mm×0.7 mm) with each optical absorbing axis crossed. The glass substrate was subjected to a clean room work at the applied pressure of about 5 kg/cm$^1$ so that bubbles or impurities might not be generated. In order to grasp moisture-heat resistance of the specimens, the specimens were left at a temperature of 60° C. and a relative humidity of 90% for 1,000 hours and then observed about formation of bubbles or releases. Also, in order to evaluate heat-resistance, the specimens were left at 80° C. for 1,000 hours and then observed about formation of bubbles or releases. The specimens were left at room temperature for 24 hours immediately before evaluating the states. The evaluation standard of endurance reliability was as follows:

○: No bubble or release phenomenon was observed.

Δ: a few bubbles were generated or a release phenomenon was occurred.

x: a large quantity of bubbles were generated or release phenomenon was occurred.

Uniformity of Light Transmission (Light Leakage)

To investigate uniformity of light transmission using the same specimen above, the inventors observed whether light was leaked in a dark room using a backlight is observed. In a method of testing uniformity of light transmission, the upper polarizing plate (400 mm 200 mm) having a pressure-sensitive adhesive applied in the elongation direction of 0 and the lower polarizing plate (400 mm 200 mm) having a pressure-sensitive adhesive applied in the elongation direction of 90 were adhered to both surfaces of a glass substrate (410 mm 210 mm 0.7 mm), with crossing light axes. A method comprising leaving the specimen at 60° C. for 500 hours or at 40° C. and 70% R.H. for 500 hours, removing it at room temperature, putting the upper polarizing plate upwards, pressuring four sides of the specimen (similar to top case of liquid crystal panel) and then observing it was adopted. The uniformity of light transmission was evaluated by the following criterions.

○: It was difficult to determine non-uniformity phenomenon of light transmission by the naked eye.

Δ: A few non-uniformity phenomenon of light transmission was present.

x: A large quantity of non-uniformity phenomenon of light transmission was present.

Examples 2~3 and Comparative Examples 1~3

The same method as Example 1 above was practiced except for using pressure-sensitive adhesive layers as Table 2 below. In addition, using the prepared polarizing plates, slid distances, endurance reliability and light leakage by bend of the pressure-sensitive adhesives were measured and then the results were represented in Table 2 below.

TABLE 2

Laminating of upper or lower polarizing plates and physical properties

| | | Examples | | | Comparative Examples | | |
|---|---|---|---|---|---|---|---|
| | | 1 | 2 | 3 | 1 | 2 | 3 |
| Pressure-sensitive composition | Pressure-sensitive adhesive for upper polarizing plate | A-1 | A-1 | A-6 | A-3 | A-4 | A-2 |
| | Pressure-sensitive adhesive for lower polarizing plate | A-2 | A-3 | A-1 | A-1 | A-6 | A-5 |
| Sliddistance (μm) | Pressure-sensitive adhesive for upper polarizing plate ($X_1$) | 512 | 512 | 720 | 233 | 1320 | 350 |
| | Pressure-sensitive adhesive for lower polarizing plate ($X_2$) | 350 | 233 | 512 | 512 | 720 | 94 |

TABLE 2-continued

Laminating of upper or lower polarizing plates and physical properties

|  | | Examples | | | Comparative Examples | | |
|---|---|---|---|---|---|---|---|
|  | | 1 | 2 | 3 | 1 | 2 | 3 |
| | Difference of slid distances of pressure-sensitive adhesives for upper and lower polarizing plate (X = $X_1 - X_2$) | 162 | 279 | 208 | −279 | 600 | 256 |
| Endurance reliability | | ○ | ○ | ○ | ○ | x | x |
| Light leakage | | ○ | ○ | ○ | x | x | ○ |

As shown in Table 2 above, it can be identified that the polarizing plates of Examples 1 to 3 practiced according to the present invention have an excellent endurance reliability and light leakage over Comparative Examples 1 to 3.

INDUSTRIAL APPLICABILITY

The present invention may provide a polarizing plate having a pressure-sensitive adhesive layer containing a pressure-sensitive adhesive composition that may improve light leakage caused by a bend of liquid crystal panels as well as have excellent endurance reliability under high temperature/high humidity conditions.

Although the present invention has been described with reference to the preferred embodiment thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

The invention claimed is:

1. A liquid crystal display device comprising:
a liquid crystal panel that comprises an upper polarizing plate that is attached on one side of a liquid crystal cell by a pressure-sensitive adhesive layer for the upper polarizing plate and a lower polarizing plate that is attached on the other side of the liquid crystal cell by a pressure-sensitive adhesive layer for the lower polarizing plate, and
a backlight unit which is disposed under the liquid crystal panel which transmits light through the lower polarizing plate that is observed through the upper polarizing plate,
wherein the upper and lower polarizing plates are adhered with crossing their optical axes of 0 degree and 90 degree so that elongation axis directions of the upper and lower polarizing plates are asymmetrical, and
wherein the pressure-sensitive adhesive layers for the upper and the lower polarizing plates comply with Equation 1 and Equation 2 below:

$$\Delta X = X_1 - X_2 = 162 \text{ μm to } 279 \text{ μm} \quad (1)$$

$$X_1 \text{ and } X_2 = 233 \text{ μm to } 720 \text{ μm} \quad (2)$$

wherein,
$X_1$ is a slid distance measured with respect to the pressure-sensitive adhesive layer for the upper polarizing plate after adhering the pressure-sensitive adhesive layer to a glass plate so as to have a contact area of 1 cm×1 cm and then applying a load of 1,000 gf at room temperature (25° C.) for 1,000 seconds, $X_2$ is a slid distance measured with respect to the pressure-sensitive adhesive layer for the lower polarizing plate after adhering the pressure-sensitive adhesive layer to a glass plate so as to have a contact area of 1 cm×1 cm and then applying a load of 1,000 gf at room temperature (25° C.) for 1,000 seconds, and $\Delta X = X_1 - X_2$ is a difference between the slid distance measured with respect to the pressure-sensitive adhesive layer for the upper polarizing plate and the slid distance measured with respect to the pressure-sensitive adhesive layer for the lower polarizing plate.

2. The liquid crystal display of claim 1, wherein the pressure-sensitive adhesive layers for the upper and the lower polarizing plates are formed by acrylic, silicone, rubber, urethane, polyester, or epoxy based pressure-sensitive adhesive composition.

3. The liquid crystal display of claim 1, wherein the pressure-sensitive adhesive layers for the upper and the lower polarizing plates are formed by an acrylic pressure-sensitive adhesive composition that comprises acrylic copolymer that contains:
i) 90 to 99.9 parts by weight of (meth)acrylic acid ester monomer having an alkyl group of 1 to 4 carbon atoms; and
ii) 0.1 to 10 parts by weight of vinyl monomer and/or acrylic monomer having a cross-linkable functional group.

4. The liquid crystal display device of claim 3, wherein the (meth)acrylic acid ester monomer having an alkyl group of 1 to 4 carbon atoms is one or more selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, and sec-butyl (meth)acrylate.

5. The liquid crystal display device of claim 3, wherein the vinyl monomer and/or acrylic monomer having a cross-linkable functional group is one or more selected from the group consisting of 2-hydroxyethyl (meth)acrylate, 2-hydroxypropyl (meth)acrylate, 4-hydroxybutyl (meth)acrylate, 6-hydroxylhexyl(meth)acrylate, 2-hydroxyethyleneglycol (meth)acrylate, 2-hydroxypropyleneglycol (meth)acrylate, (meth)acrylic acid, acrylic acid dimer, itaconic acid, maleic acid, maleic anhydride, fumaric acid, acryl amide, N-vinyl pyrrolidone, and N-vinyl carprolactam.

6. The liquid crystal display device of claim 3, wherein the acrylic copolymer further comprises vinyl monomer of Formula 1:

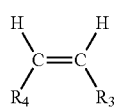

Formula 1 wherein, $R_4$ represents hydrogen or alkyl, $R_3$ represents cyano, phenyl unsubstituted or substituted with alkyl, acetyloxy, or $COR_5$, where $R_5$ represents amino or glycidyloxy unsubstituted or substituted with alkyl.

7. The liquid crystal display device of claim 3, wherein said acrylic pressure-sensitive adhesive composition further comprises 0.1 to 10 parts by weight of a cross-linking agent based on 100 parts by weight of acrylic copolymer.

8. The liquid crystal display device of claim 7, wherein said cross-linking agent is one or more selected from the group consisting of isocyanate compounds, epoxy compounds, aziridine compounds, and metal chelate compounds.

9. The liquid crystal display device of claim 3, wherein the acrylic pressure-sensitive adhesive composition has a cross-linking density of 5 to 95%.

10. The liquid crystal display device of claim 1, further comprising one or more layers selected from the group consisting of a protective layer, a reflective layer, a phase retardation plate, a compensation film for wide view angle and a brightness enhancing film.

\* \* \* \* \*